United States Patent [19]

Adachi

[11] Patent Number: 6,071,417
[45] Date of Patent: Jun. 6, 2000

[54] METHOD FOR REMOVING WATER SOLUBLE MACROMOLECULAR COMPOUNDS

[75] Inventor: Tsuneyasu Adachi, Tokyo, Japan

[73] Assignee: Kurita Water Industries, Ltd., Japan

[21] Appl. No.: 08/970,457

[22] Filed: Nov. 14, 1997

[30] Foreign Application Priority Data

Nov. 15, 1996 [JP] Japan ..................................... 8-321007

[51] Int. Cl.[7] .................................................. B01D 21/01
[52] U.S. Cl. ........................... 210/723; 210/726; 210/727
[58] Field of Search ..................................... 210/702, 723, 210/725, 726, 727

[56] References Cited

U.S. PATENT DOCUMENTS 4,078,129  3/1978  Yamagata et al. ........................ 210/723
5,552,316  9/1996  Savage ..................................... 210/723

FOREIGN PATENT DOCUMENTS 301 456    2/1993  Germany .
50001555   9/1975  Japan .

Primary Examiner—David A. Simmons
Assistant Examiner—Frank M. Lawrence
Attorney, Agent, or Firm—Morrison Law Firm

[57] ABSTRACT

A method for removing water-soluble macromolecular compounds is characterized by addition of alkali polyphosphates to an aqueous solution containing residual amounts of cationic, anionic, or amphoteric water-soluble macromolecular compounds, formation of insoluble complexes of the alkali polyphosphate and the water-soluble macromolecular complexes, and separation of the resulting complexes from the aqueous solution. This method does not affect the quality or yield of other important components in the aqueous solution.

20 Claims, 1 Drawing Sheet

METHOD FOR REMOVING WATER SOLUBLE MACROMOLECULAR COMPOUNDS

BACKGROUND OF THE INVENTION

The present invention relates to a removal method for water-soluble macromolecular compounds. Specifically, the present invention relates to a method for removing water-soluble high molecular weight compounds, wherein cationic, anionic, or amphoteric water-soluble macromolecular compounds are removed from an aqueous solution without affecting the quality and yield of other components in the solution. More specifically, the present invention relates to a method for removing water-soluble high molecular weight compounds, particularly flocculants, from aqueous solutions containing fermentation products. This method does not reduce the activity or the recovery yield of fermentation products, and completely removes excess macromolecular flocculants in the solution.

Water-soluble high molecular weight macromolecular compounds are used industrially in a variety of fields. These compounds are useful as flocculants and dehydrants in waste water treatment, as yeast-separating agents in fermentation production processes, as scale-preventing agents for cooling water systems, and as drainage aids in paper production processes. However, if these compounds are not removed from the solution, problems such as increased environmental pollution and decreased product quality can arise. In other instances, adherence of the macromolecular compounds to pipes or membranes may result in decreased processing efficiency. As a result, it is often desirable to remove the water-soluble macromolecular compounds from the aqueous solution.

When producing valuable substances by fermentation, such as enzymes and the like, yeast cells used in production are typically separated from the fermentation products by solid-liquid separation techniques, such as membrane filtration or centrifugation. Macromolecular flocculants are used to aggregate the yeast cells, and the aggregated yeast cells are then separated from the fermentation products which remain in solution. However, these separation techniques often leave excess macromolecular flocculant in solution. The residual macromolecular flocculent can mix with the fermentation products and reduce the quality of the product. Alternatively, the excess flocculent may adhere to membranes or ion exchange resins used in subsequent purification of the fermentation products, causing a marked decrease in performance.

Various methods have been proposed for removing water-soluble high molecular weight compounds from solution. For example, in Japanese Patent Publication Number Sho 54-2992, a method is proposed wherein an anionic surfactant is added to waste water containing a cationic macromolecular flocculent, thereby generating a water insoluble compound. In Japanese Patent Publication Number Sho 50-51467, there is proposed a method wherein metallic salts such as aluminum salts and iron salts are added during coagulation processing of a suspension. The amount of macromolecular flocculant which leaks out is thereby minimized. In Japanese Patent Publication Number Sho 50-56365, there is proposed a method wherein metallic salts, such as aluminum salt or iron salt, and a macromolecular flocculent are used jointly for the coagulation processing of a suspension. First, metallic salt is added, and thereafter macromolecular flocculant is added before the formation of a metallic hydroxide is completed. In this fashion, the amount of macromolecular flocculant which leaks out of the complexes and reenters the processed water is minimized.

These methods apply only to either an anionic macromolecular flocculant or a cationic macromolecular flocculent. Consequently, amphoteric water-soluble macromolecular compounds cannot be used. Furthermore, if metallic salts or surfactants are added to a fermentation solution containing enzymes, the activity of the fermentation products may lowered. As a result, in the prior art it was not possible to have a single method for efficient removal of water-soluble macromolecular compounds used in various industrial processes.

OBJECTS AND SUMMARY OF THE INVENTION

Briefly stated, a method for removing water-soluble macromolecular compounds is characterized by addition of alkali polyphosphates to an aqueous solution containing residual amounts of cationic, anionic, or amphoteric water-soluble macromolecular compounds, formation of insoluble complexes of the alkali polyphosphate and the water-soluble macromolecular complexes, and separation of the resulting complexes from the aqueous solution. This method does not affect the quality or yield of other important components in the aqueous solution.

According to an embodiment of the present invention, a method for removing residual cationic, anionic, or amphoteric water-soluble macromolecular compounds from an aqueous solution comprises the steps of adding a polyphosphate to the aqueous solution, such that insoluble complexes of the polyphosphate and the water-soluble macromolecular compounds are formed, and separating the insoluble complexes from the aqueous solution.

According to another embodiment of the present invention, a method for purifying a fermentation production process solution containing fermentative cells comprises the steps of adding one of a water-soluble cationic flocculent and a water-soluble amphoteric flocculant to the solution, thereby forming aggregates of the fermentative cells, adding a polyphosphate to the aqueous solution, such that insoluble complexes of the polyphosphate and the water-soluble flocculant are formed, and separating the insoluble complexes from the aqueous solution.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
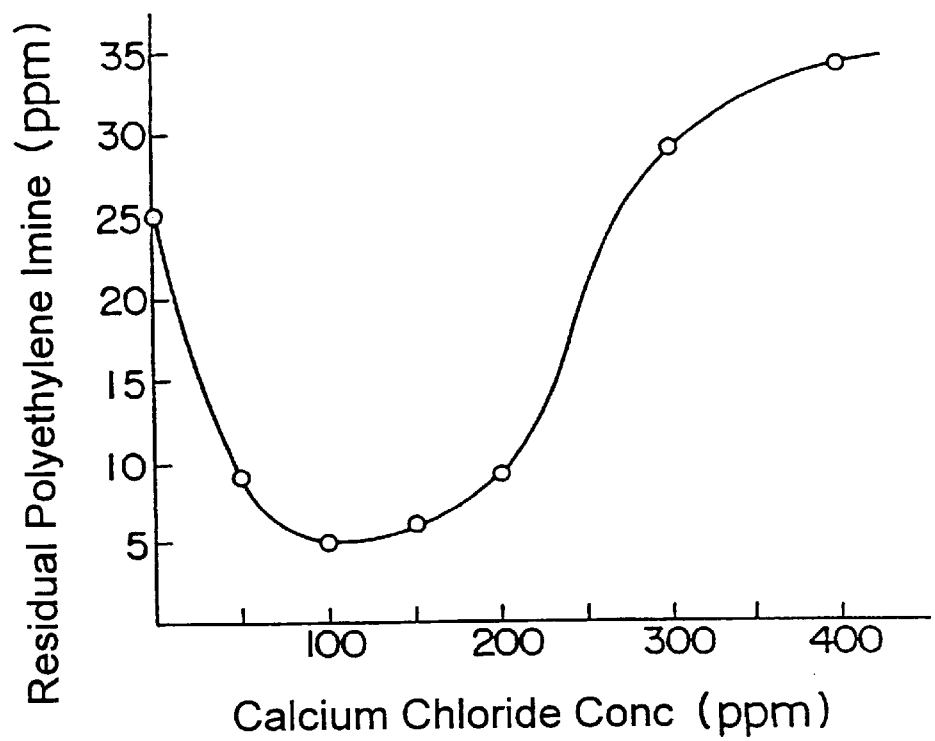
FIG. 1 demonstrates the relationship between calcium chloride concentration and the amount of residual polyethyleneimine in solution after treatment.

As a result of intense research in order to solve the above problems, it was discovered that water soluble macromolecular compounds can be efficiently removed from an aqueous solution which contains cationic, anionic, or amphoteric water-soluble macromolecular compounds by the addition of polyphosphate. The method of the present invention can be applied to aqueous solutions containing residual cationic, anionic, or amphoteric water-soluble macromolecular compounds. The water-soluble macromolecular compounds may be synthetic macromolecular electrolytes, or they may be macromolecular electrolytes obtained by denaturing a natural macromolecular compound. Examples of aqueous solutions which contain these macromolecular compounds include processed water containing macromolecular flocculants which leaked out of aggregates and complexes after coagulation, exhaust waste water of cooling water which contains a scaling inhibiting agent and no other useful substances, fermentation processing water after yeast removal, and water which contains valuable products other than the water-soluble macromolecular compounds which are to be removed, such as process water in paper pulp production processes. In particular, the method of the present invention can be used in a method which employs a cationic macromolecular flocculant for separating yeast cells from a solution which contains fermentation products and cells.

Cationic water-soluble macromolecular compounds which can be removed by the method of the present invention include, for example, polyethyleneimine, polyvinylamine, polyvinylamidine, poly(meta)allylamine, halogenated polydiallylammonium, polyaminoalkylmethacrylate, and chitosan. Anionic water-soluble macromolecular compounds which can be removed by the method of the present invention include, for example, sodium polyacrylate, carboxymethylcellulose polyacrylamide partial hydrolysis product, and acrylamide-acrylic acid copolymer.

By the present invention, amphoteric water soluble macromolecular compounds which remain in the aqueous solution can also be removed. Examples of amphoteric water-soluble macromolecular compounds include compounds which have anionic groups, such as carboxyl groups or sulfone groups, introduced into the cationic water-soluble macromolecular compounds given above.

In the method of the present invention, there are no particular limitations to the polyphosphate. Alkali metallic salts of a polyphosphate which are either a long-chain aliphatic structure or a ring structure, and which have a variety of degrees of condensation and condensation degree distribution, may be used. For example, sodium polyphosphate or potassium polyphosphate may be used. These polyphosphates can be obtained as a substance with 40–80% by weight phosphorus pentoxide, and may be produced by, for example, mixing and heating phosphate and an alkali hydroxide, or by mixing and heating a phosphate (I) alkali metal salt and a phosphate (II) alkali metal salt. Among these forms of polyphosphate, sodium polyphosphate is particularly preferred.

In the method of the present invention, the amount of polyphosphate salt to be added may vary depending on the target water systems. However, the amount is preferably 1–20 times the weight of the cationic, anionic, or amphoteric macromolecular compound which remains in the aqueous solution. More preferably, it should be 2–10 times the weight. If the amount of polyphosphate which is added is less than the weight of the cationic, anionic, or amphoteric macromolecular compound which remains in the aqueous solution, or greater than 20 times the weight of the cationic, anionic, amphoteric water-soluble macromolecular compound, the percentage of the water-soluble macromolecular compound removed may be undesirably diminished.

In the present invention, it is further preferable to add an alkali earth metallic salt to the aqueous solution. The alkali earth metallic salt which is to be added has no particular limitations, as long as it is water-soluble. For example, the alkali earth metallic salt may include the following: beryllium fluoride, beryllium chloride, beryllium bromide, beryllium nitrate, beryllium sulfate, magnesium chloride, magnesium bromide, magnesium iodide, magnesium nitrate, magnesium sulfate, magnesium hydrogensulfate, magnesium thiosulfate, magnesium phosphate, magnesium chlorate, magnesium bromate, magnesium perchlorate, magnesium thiocyanate, magnesium formate, magnesium acetate, magnesium lactate, magnesium benzoate, magnesium salicylate, magnesium acetylsalicylate, calcium chloride, calcium bromide, calcium iodide, calcium nitrate, calcium nitrite, calcium thiosulfate, calcium hypophosphite, calcium chlorate, calcium thiocyanate, calcium formate, calcium acetate, calcium propionate, calcium 2-ethylbutanate, calcium lactate, calcium thioglycolate, calcium ascorbate, calcium levulinate, calcium acetylsalicylate, calcium phenolsulfonate, strontium chloride, strontium bromide, strontium iodide, strontium nitrate, strontium chlorate, strontium bromate, strontium formate, strontium acetate, strontium lactate, barium chloride, barium bromide, barium iodide, barium nitrate, barium nitrite, barium chlorate, barium perchlorate, and barium acetate. Among these alkali earth metallic salts, calcium chloride is particularly preferable.

In the present invention, the amount of alkali earth metallic salt to be added is preferably 0.1–20 times the weight of the cationic, anionic, or amphoteric water-soluble macromolecular compound. It is more preferable for the amount to be 0.2–10 times the weight. If the amount of alkali earth metallic salt to be added is less than 0.1 times the weight or greater than 20 times the weight of the cationic, anionic, or amphoteric water-soluble macromolecular compound, the percentage of the water-soluble macromolecular compound removed may be undesirably diminished.

In the method of the present invention, the amount of polyphosphate added is preferably 0.2 to 5 times the weight of the alkali earth metallic salts. Even more preferable is a ratio of 1 to 3 times the weight. If the ratio of the polyphosphate to the alkali earth metallic salts is less than 0.2 or more than 5 times by weight, the percentage of the water-soluble macromolecular compound removed may be undesirably diminished.

In the present invention, there are no particular limitations to the order in which the alkali earth metallic salt and the polyphosphate are added to the aqueous solution. However, the removal percentage of the water-soluble macromolecular compound is higher if polyphosphate and alkali earth metallic salt are added simultaneously than if the polyphosphate is added first. If polyphosphate is added after the alkali earth metallic salts, the removal percentage is even higher. Therefore, the preferred order in which substances are added to the aqueous solution is the alkali earth metallic salt first, and then polyphosphate.

In the present invention, the cationic, anionic, or amphoteric water-soluble macromolecular compounds which remain in an aqueous solution react with polyphosphate or polyphosphate and alkali earth metallic salts. A water insoluble reaction product is created, and the solution turns cloudy and white. This water-insoluble reaction product can be removed by sedimentation, filtration, membrane separation, or centrifugation.

If the reaction products of the water-soluble macromolecular compound and polyphosphate, or the reaction products of the water-soluble macromolecular compound, the alkali earth metallic salts, and polyphosphate are dispersed due to proteins present in the solution, water insoluble particles may be further added. The water insoluble reaction products adsorb to the water insoluble particles, and by separating the particles from the solution after adsorption, the reaction products are readily removed. There are no particular limitations to the water insoluble particles which are added. For example, inorganic materials, such as kaolin, shirasu (a volcanic ash stone from the Kyushu region of Japan), diatomaceous earth, silica gel, or activated carbon, or organic materials such as pulp powder, cellulose powder, or styrene-divinyl benzene copolymer may be used.

By the method of the present invention, over 80% of the cationic, anionic, or amphoteric water-soluble macromolecular compounds which remain in an aqueous solution can be removed. Furthermore, when using a macromolecular flocculant to aggregate and separate cells in a fermentation production process, it is possible to selectively remove the macromolecular flocculant, without impairing the recovery rate of the valuable fermentation products.

In a fermentation solution, the cells are typically negatively charged. Therefore, by adding a cationic macromolecular flocculant or an amphoteric macromolecular flocculant, the charge of the cells is neutralized. The macromolecular flocculant may also be adsorbed to the cell surface. Therefore, aggregation can occur, due to static electrical attraction between the charge on the surface of the cell and the macromolecular flocculant. As a result, it is possible to separate the cell aggregates and the fermentation products which are in solution.

There are no particular limitations to the method for separation of cell aggregates formed in this manner. For example, cell aggregates can be removed by filtration, centrifugation, or membrane separation. Alternatively, an anionic macromolecular flocculant can be added to the solution which contains cells which have been aggregated by a cationic macromolecular flocculent, and the mass allowed to grow further. Cell aggregates may also be separated from fermentation products by a belt press type water removal device.

When separating cell aggregates from fermentation products by this kind of solid-liquid separation method, excess cationic macromolecular flocculants remain in solution. In the method of the present invention, polyphosphate is added to the solution to remove these residual cationic macromolecular flocculants. By adding polyphosphate to a solution which contains remnants of macromolecular flocculent, the remaining macromolecular flocculent and polyphosphate react, and a water insoluble reaction product is generated. The reaction between the macromolecular flocculant and polyphosphate proceeds rapidly at room temperature with the addition of polyphosphate. However, in order to ensure that the reaction goes to completion, it is preferable to employ a reaction time of between about 5–60 minutes after adding polyphosphate.

It is also possible, with the method of the present invention, to add polyphosphate to a solution which contains cell aggregates formed by addition of a cationic macromolecular flocculent, without prior separation of the cell aggregates from the solution.

The reaction products of the macromolecular flocculent and polyphosphate can be removed by solid-liquid separation methods such as, for example, filtration, membrane separation, and/or centrifugation. If water-insoluble particles are present in the solution which contains the reaction products of the macromolecular flocculant and polyphosphate, reaction products are adsorbed to these particles. The separation of the reaction products through solid-liquid separation becomes simple and certain. Polyphosphate can be added to react with the excess macromolecular flocculant present in a solution having cell aggregates formed by addition of macromolecular flocculants to a fermentation solution. Because reaction products of the macromolecular flocculant and polyphosphate are adsorbed to the cell aggregate, it is possible to remove the reaction product of the remaining macromolecular flocculant and polyphosphate when cell aggregates are separated from solution.

Where polyphosphate is added to an aqueous solution containing fermentation products and cell aggregates generated by addition of macromolecular flocculants to the fermentation solution, reaction products of the macromolecular flocculant and the polyphosphate are formed. It is preferable in this case to add water insoluble particles as described before to enhance the separation of the reaction products.

With the method of the present invention, valuable products produced by fermentation and residual cationic macromolecular flocculent used to remove the fermentative cells are separated. It is possible to selectively remove over 80% of the macromolecular flocculant without lowering the activity or the recovery rate of the fermentation products.

Embodiment 1

Five solutions containing 100 ml of phosphate buffer solution (8 mM $NaH_2PO_4$+12 mM $Na_2HPO_4$+0.1 M NaCl, pH 7.2) containing 50 ppm polyethyleneimine (molecular weight 70,000) were prepared. A control solution included no sodium polyphosphate (sample A). In the remaining four solutions, sodium polyphosphate (Kisida Chemicals) was added and stirred to make final concentrations of 25 ppm (sample B), 50 ppm (sample C), 100 ppm (sample D), and 200 ppm (sample E). After standing for one hour at room temperature, kaolin (Kisida Chemicals) was added to each beaker at 0.4% by weight with respect to the solution, and the solutions were stirred for one minute. The kaolin was removed using a filter with a pore size of 5 micrometers (Mylex SV, Millipore Japan). The total organic carbon (TOC) within the filtrate was measured using a total organic carbon meter (TOC-5000, Shimadzu Products).

TOC was similarly measured in a phosphate buffer solution which contained 50 ppm polyethyleneimine (molecular weight 70,000) (sample F) and in a phosphate buffer solution containing no polyethyleneimine (sample G). Sodium polyphosphate and kaolin were not added to samples F and G.

Referring to Table 1, it can be seen that the TOC in sample A was 14 ppm, in sample B 11 ppm, in sample C 3.7 ppm, in sample D 2.0 ppm, in sample E 2.3 ppm, in sample F 25 ppm, and in sample G 0.2 ppm.

TABLE 1

| Sample | Polyethyleneimine (ppm) | $Na^+$ polyphosphate (ppm) | Kaolin (wt %) | TOC (ppm) |
| --- | --- | --- | --- | --- |
| A | 50 | 0 | 0.4 | 14 |
| B | 50 | 25 | 0.4 | 11 |
| C | 50 | 50 | 0.4 | 3.7 |
| D | 50 | 100 | 0.4 | 2.0 |
| E | 50 | 200 | 0.4 | 2.3 |
| F | 50 | 0 | 0 | 25 |
| G | 0 | 0 | 0 | 0.2 |

From the TOC values of samples A–E, it can be seen that by adding 50 ppm or greater of sodium polyphosphate, followed by addition of kaolin, over 85% of the polyethyleneimine in solution can be removed. In other words, adding sodium polyphosphate to an amount greater than or equal to the weight of polyethyleneimine in solution removes substantially all of the polyethyleneimine.

Embodiment 2

Two solutions of each of the following were prepared: 100 ml of phosphate buffer solution (8 mM NaH$_2$PO$_4$+12 mnM Na$_2$HPO$_4$+0.1 M NaCl, pH 7.2) containing 100 ppm polyethyleneimine (molecular weight 70,000); 100 ml of phosphate buffer solution containing 100 ppm chitosan (molecular weight 100,000); and 100 ml of phosphate buffer solution containing 100 ppm polyvinylamidine (molecular weight 3,000,000). To one of each of these, sodium polyphosphate was added and stirred to a final concentration of 200 ppm. After standing for one hour at room temperature, kaolin was added at 0.4% by weight relative to the solution, and the solutions were stirred for one minute. As in embodiment 1, kaolin was removed by a filter with a pore size of 5 micrometer, and TOC in the filtrate was measured.

TOC was further measured for unprocessed phosphate buffer solutions containing polyethyleneimine, chitosan, or polyvinylamidine.

Referring to Table 2, when sodium polyphosphate and kaolin were added, the TOC value for the solution which contained polyethyleneimine was 5.3 ppm. For the solution which contained chitosan, the TOC value was 4.3 ppm. The TOC value was 4.8 ppm for the solution containing polyvinylamidine. TOC values for the untreated solutions were as follows: for the untreated solution containing polyethyleneimine, 56 ppm; for the untreated solution containing chitosan, 44 ppm; and for the untreated solution containing polyvinylamidine, 50 ppm.

TABLE 2

| Polymer | Na$^+$ polyphosphate | Kaolin (wt %) | TOC (ppm) |
|---|---|---|---|
| Polyethyleneimine | 200 | 0.4 | 5.8 |
| Chitosan | 200 | 0.4 | 4.3 |
| Polyvinyl amidine | 200 | 0.4 | 4.8 |
| Polyethyleneimine | 0 | 0 | 56 |
| Chitosan | 0 | 0 | 44 |
| Polyvinyl amidine | 0 | 0 | 50 |

TOC values for each of the solutions were roughly proportional to the amount of macromolecular flocculant which existed in solution. Referring to Table 2, it can be seen that by adding sodium polyphosphate to solutions containing macromolecular flocculant and by further adding kaolin, over 90% of the macromolecular flocculent in solution can be removed.

Embodiment 3

Six solutions of 100 ml of phosphate buffer solution (8 mM NaH$_2$PO$_4$+12 mM Na$_2$HPO$_4$+0.1 M NaCl, pH 7.2) containing 100 ppm polyethyleneimine (molecular weight 70,000) were prepared. Sodium polyphosphate was added and stirred to each to a final concentration of 200 ppm. After standing at room temperature for 1 hour, kaolin (Kisida Chemical), diatomaceous earth (Kisida Chemical), particle activated carbon (Kurare Chemical), silica gel (E. Merck), Sepabeads™ (styrene-divinyl benzene copolymer, Mitsubishi Chemical) and KC Floc (pulp powder, Japan Paper) were each added to a separate solution at 0.4% by weight with respect to the solution. The solutions were stirred for one minute. As in Embodiment 1, the particles were removed by a filter with pore size 5 micrometer, and TOC in the filtrate was measured.

Similarly, TOC was measured for untreated phosphate buffer solutions containing 100 ppm polyethyleneimine (molecular weight 70,000) and untreated phosphate buffer solution containing no polyethyleneimine.

Referring to Table 3, the TOC values were 5.4 ppm for the solution which had kaolin added, 7.9 ppm for the solution which had diatomaceous earth added, 17 ppm for the solution which had particle activated carbon added, 16 ppm for the solution which had silica gel added, 12 ppm for the solution which had Sepabeads™ added, and 15 ppm for the solution which had KC Floc added. On the other hand, TOC for the phosphate buffer solution which contained polyethyleneimine was 56 ppm, and TOC for the phosphate buffer solution which contained no polyethyleneimine was 0.4 ppm.

TABLE 3

| Polyethyleneimine (ppm) | Na$^+$ polyphosphate (ppm) | Water insoluble particles | TOC (ppm) |
|---|---|---|---|
| 100 | 200 | kaolin | 5.4 |
| 100 | 200 | diatomaceous earth | 7.9 |
| 100 | 200 | particle activated carbon | 17 |
| 100 | 200 | silica gel | 16 |
| 100 | 200 | Sepabeads ™ | 12 |
| 100 | 200 | KC Floc | 15 |
| 100 | 0 | none | 56 |
| 0 | 0 | none | 0.4 |

The TOC of 56 ppm for the sample with no sodium polyphosphate and no water insoluble particles added corresponded to 100 ppm polyethyleneimine in solution. The TOC of 0.4 ppm for the sample which contains no polyethyleneimine corresponds to 0 ppm polyethyleneimine. Therefore, by further addition of water insoluble particles to solutions containing polyphosphate, it is possible to remove over 70% of the polyethyleneimine in solution.

Comparison 1

The same operations were performed as in embodiment 3, except that no sodium polyphosphate was added.

Referring to Table 4, TOC values were 45 ppm for the solution which had kaolin added, 43 ppm for the solution which had diatomaceous earth added, 54 ppm for the solution which had particle activated carbon added, 49 ppm for the solution which had silica gel added, 54 ppm for the solution which had Sepabeads™ added, and 52 ppm for the solution which had KC Floc added.

TABLE 4

| Polyethyleneimine (ppm) | Na$^+$ polyphosphate (ppm) | Water insoluble particles | TOC (ppm) |
|---|---|---|---|
| 100 | 0 | kaolin | 45 |
| 100 | 0 | diatomaceous earth | 43 |
| 100 | 0 | particle activated carbon | 54 |
| 100 | 0 | silica gel | 49 |
| 100 | 0 | Sepabeads ™ | 54 |
| 100 | 0 | KC Floc | 52 |
| 100 | 0 | none | 56 |
| 0 | 0 | none | 0.4 |

From a comparison of the TOC values shown in Tables 3 and 4, it can be seen that if sodium polyphosphate is not added to the polyethyleneimine solution, the polyethyleneimine in the solution is not effectively removed. The addition of water insoluble particles does not improve removal of the polyethyleneimine in the absence of polyphosphate.

Embodiment 4

In a solution of phosphate buffer solution (8 mM NaH$_2$PO$_4$+12 mM Na$_2$HPO$_4$+0.1 M NaCl, pH 7.2) containing 100 ppm bovine serum albumin (fraction V, Biochemical Industries), polyethyleneimine (molecular weight 70,000) was added to a concentration of 100 ppm. Sodium polyphosphate was added to this solution and mixed to a final concentration of 200 ppm. After standing for one hour at room temperature, kaolin was added to make 0.4% by weight. The solution was stirred for one minute. As in embodiment 1, the particles were removed with a filter of 5 micrometer pore size. TOC of the filtrate was measured. In addition, the UV absorbency of the albumin in the filtrate at wavelength of 280 nm ($A_{280}$) was measured using a spectrophotometer (UV-1600, Shimadzu Products). The TOC value of this solution was 51 ppm, and the $A_{280}$ was 0.057.

In a similar manner, TOC and $A_{280}$ were measured for a phosphate buffer solution containing 100 ppm bovine serum albumin, for a phosphate buffer solution containing 100 ppm polyethyleneimine, and for a phosphate buffer solution containing 100 ppm bovine serum albumin and 100 ppm polyethyleneimine. Referring to Table 5, the TOC value for the phosphate buffer solution which contained bovine serum albumin was 50 ppm, and $A_{280}$ was 0.059. For the phosphate buffer solution which contained polyethylene, the TOC value was 56 ppm, and $A_{280}$ was 0.000. For the phosphate buffer solution which contained bovine serum albumin and polyethyleneimine, the TOC value was 102 ppm, and $A_{280}$ was 0.059.

TABLE 5

| Sample | TOC (ppm) | Absorbance (280 nm) |
| --- | --- | --- |
| Albumin solution (100 ppm) | 50 | 0.059 |
| Polyethyleneimine solution (100 ppm) | 56 | 0.000 |
| Albumin (100 ppm) and polyethyleneimine (100 ppm) | 102 | 0.059 |
| $Na^+$ phosphate, kaolin, albumin (100 ppm) and polyethyleneimine (100 ppm) | 51 | 0.057 |

Addition of sodium polyphosphate and kaolin to the solution containing bovine serum albumin and polyethylene albumin caused a two-fold reduction in TOC, while the absorbency at 280 nm was unchanged. From these results, it can be seen that polyethyleneimine is selectively removed by addition of polyphosphate and kaolin, and the addition of sodium polyphosphate and kaolin had no effect on the level of albumin.

Embodiment 5

(1) Making Labeled Polyethyleneimine 1.0 g of polyethyleneimine (molecular weight 70,000) was added to 100 ml of distilled water containing 1.0 g of sodium bicarbonate, and the solution was stirred and dissolved. To this solution, 200 mg of dansyl chloride (Wako Pure Chemicals) dissolved in 100 ml of ethanol was added with stirring. This mixture solution was covered with aluminum foil to avoid light exposure, and reacted for 10 minutes at 60 degrees C. The solution was then precipitated by adding the solution to 1 liter of acetone. The polymer which was obtained after filtering was dissolved once again in distilled water, and reprecipitated in 1 liter of acetone. The polymer obtained from filtration was dried overnight in a vacuum desiccator. Labeled polyethyleneimine (0.12 g; fluorescent substance 0.5 mol %) was thus obtained.

(2) Preparation of Culture Solution

In a 500 ml culture flask, *B. subtils* IFO 13719 was grown for two days at 37 degrees C. The culture was grown in a solution with the following composition: 2% by weight starch, 2% by weight polypeptone, 0.1% by weight $KH_2PO_4$, 0.05% by weight $MgSO_4\text{-}7H_2O$, and 0.1% by weight yeast extract.

(3) Measurement of Fluorescence

The culture solution prepared as above was centrifuged for 25 minutes at 6,000 rpm. The solid fraction was removed, and labeled polyethyleneimine was added to the clear solution to a concentration of 10 ppm. This solution was placed in a quartz cell with an optical path length of 10 mm. Using a spectrofluorophotometer (Model F4010, Hitachi Products), the solution was measured with an excitation wavelength of 310 nm and a fluorescent wavelength of 525 nm.

(4) Polyethyleneimine Removal Experiment 1

The concentration of the solids in the solution which was cultured as above was 5,000 ppm. To this culturing solution, labeled polyethyleneimine was added to a concentration of 500 ppm. The solids which were suspended in the culture solution aggregated and precipitated. This solution was centrifuged for 25 minutes at 3,000 rpm. The fluorescence strength of the clear solution with the aggregated solids removed was measured under the same conditions as above. From the predetermined calibration curve, it was found that the concentration of the remaining labeled polyethyleneimine was 42 ppm. The total protein content of the solution after centriflgation, measured by Protein Assay™ (Bio Rad Laboratories), was 7,200 ppm. Next, sodium polyphosphate was added with stirring to the solution which had been centrifuged to a concentration of 150 ppm. The solution was allowed to stand for 1 hour. Kaolin was then added to the solution at 0.4% by weight. The solution was stirred for 1 minute. The kaolin was removed, using a filter with a pore size of 5 micrometer. The fluorescent strength of the resulting filtrate was measured. The concentration of the remaining labeled polyethyleneimine was 3.5 ppm. The total protein content of the solution which had kaolin removed was 7,000 ppm.

(5) Polyethyleneimine Removal Experiment 2

As in polyethyleneimine removal experiment 1, labeled polyethyleneimine was added to the culture solution to make a concentration of 500 ppm. Solids which were suspended in the culture solution aggregated and precipitated. Next, sodium polyphosphate was added to the solution with suspended aggregates to make a concentration of 150 ppm, and the solution was stirred for 1 minute. This solution was centrifuged for 25 minutes at 3,000 rpm. The fluorescent strength of the resulting supernatant was measured. The concentration of remaining labeled polyethyleneimine was 4.3 ppm. The total protein content of the solution after centriftigation was 7,100 ppm.

Comparison 2

Using the labeled polyethyleneimine and the culture solution which were prepared in embodiment 5, processing was conducted without addition of sodium polyphosphate.

To the culture solution, labeled polyethyleneimine was added to a final concentration of 500 ppm. The solids which were suspended in the culture solution aggregated and precipitated. This solution was centrifuged for 25 minutes at 3,000 rpm. The aggregated solids were removed. To this solution, kaolin was added at 0.4% by weight, and the solution was stirred for 1 minute. Kaolin was removed using a filter having a pore size of 5 micrometer. The fluorescent strength of the resulting filtrate was measured. The concentration of labeled polyethyleneimine was 32 ppm. The total protein content of the supernatant was 7,100 ppm.

From the results of embodiment 5 and comparison 2, it is evident that by adding sodium polyphosphate, the remnants of polyethyleneimine can be removed effectively without reducing the recovery rate of protein in the solution. Furthermore, from the results of embodiments 1–4, it is clear that the effects are the same even if normal cationic high molecular flocculants other than labeled polyethyleneimine are used.

Embodiment 6

Eight 100 ml aqueous solution were prepared, each containing 100 ppm polyethyleneimine (molecular weight 70,000) adjusted to pH 7.0 by addition of 0.1 N hydrochloric acid. Calcium chloride (Kisida Chemicals) was added to each of six samples to final concentrations of 50 ppm, 100 ppm, 150 ppm, 200 ppm, 300 ppm, and 400 ppm. Calcium chloride was not added to the remaining two samples. To the six samples having added calcium chloride, sodium polyphosphate (Kisida Chemicals) was added to a final concentration of 200 ppm, and the resulting solutions were stirred. The samples became cloudy and white. Sodium polyphosphate was also added with stirring to one of the two samples containing no added calcium chloride to a final concentration of 200 ppm.

After standing for 1 hour, kaolin was added to each sample at 0.4% by weight, and the solutions were stirred. Kaolin was then removed using a filter with pore size of 5 micrometer (Mylex SV, Millipore Japan). The total organic carbon (TOC) of the filtrate was measured using a total organic carbon meter (TOC-5000, Shimadzu Products). The amount of polyethyleneimine remaining in the filtrate was calculated from the value of TOC. The results are shown in FIG. 1.

Referring to FIG. 1, it can be seen that residual polyethyleneimine was removed at calcium chloride concentrations between 100 and 200 ppm, and that calcium chloride concentrations outside this range resulted in less effective removal of residual polyethyleneimine. At calcium chloride concentrations of 0 ppm, 50 ppm, 100 ppm, 150 ppm, 200 ppm, 300 ppm, and 400 ppm, respectively, the remaining amount of polyethyleneimine was 25 ppm, 9 ppm, 5 ppm, 6 ppm, 9 ppm, 29 ppm, and 34 ppm.

Embodiment 7

Five 100 ml aqueous solutions were prepared, each containing 100 ppm polyethyleneimine (molecular weight 70,000) adjusted to pH 7.0 by addition of 0.1 N hydrochloric acid. To each, calcium chloride was added to a concentration of 400 ppm. To these sample solutions, sodium polyphosphate was added to concentrations of 200 ppm, 500 ppm, 1,000 ppm, 1,500 ppm, and 2,000 ppm. After stirring, the solutions became cloudy and white.

Figure 2:
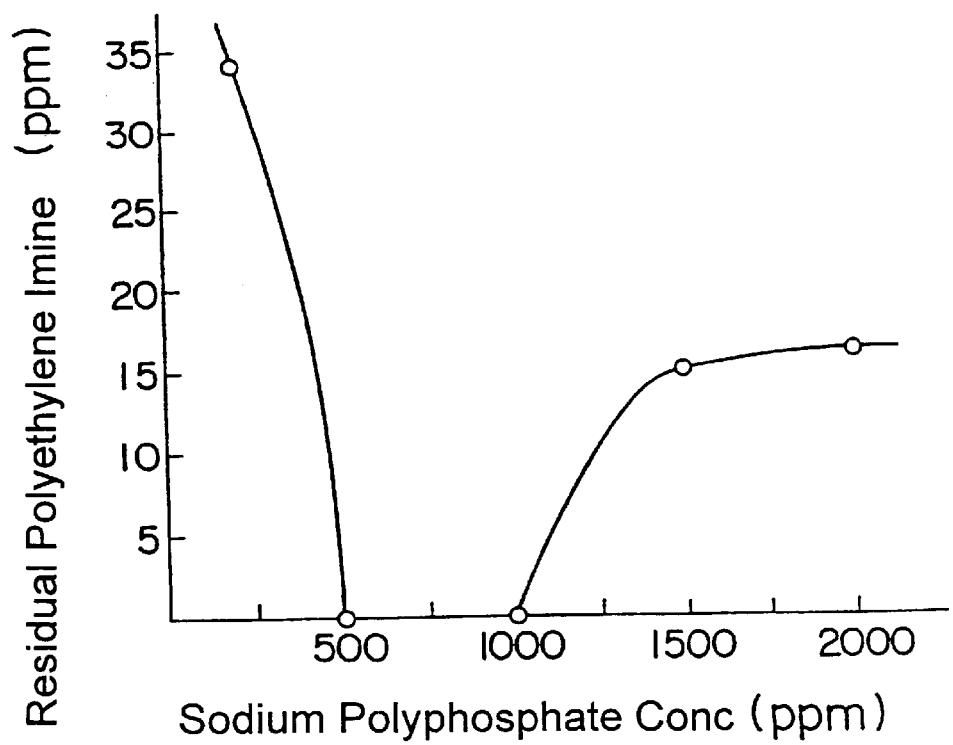
FIG. 2 demonstrates the relationship between sodium polyphosphate concentration and the amount of residual polyethyleneimine in solution after treatment.

After standing for 1 hour at room temperature, kaolin was added at 0.4% by weight with respect to the solution. The solutions were stirred for 1 minute. As in embodiment 1, a filter was used to remove kaolin. The TOC in the filtrates were measured. From the values of the TOC, the amount of polyethyleneimine remaining in the filtrates could be calculated. The results are shown in FIG. 2. For sodium polyphosphate concentrations of 200 ppm, 500 ppm, 1,000 ppm, 1,500 ppm, and 2,000 ppm, respectively, there were 34 ppm, 0 ppm, 0 ppm, 15 ppm, and 16 ppm of polyethyleneimine remaining.

Referring to the results from FIGS. 1 and 2, it is possible to remove polyethyleneimine from aqueous solutions by adding only sodium polyphosphate. However, the removal percentage of polyethyleneimine is dramatically improved by using calcium chloride and sodium polyphosphate in combination. Furthermore, when using calcium chloride and sodium polyphosphate in combination, there is an optimal ratio of calcium chloride to sodium polyphosphate. If more than the optimal amount of either calcium chloride or sodium polyphosphate is added, the removal percentage of polyethyleneimine is lowered.

Comparison 3

Three 100 ml solutions were prepared, each containing 100 ppm polyethyleneimine (molecular weight 70,000) adjusted to pH 7.0 by addition of 0.1 N hydrochloric acid. To each solution, calcium chloride was added to final concentrations of 100 ppm, 200 ppm, and 400 ppm. The sample solutions did not become cloudy.

After standing for one hour, kaolin was added at 0.4% weight with respect to the solution. The solutions were stirred for 1 minute. Filtration was conducted as in embodiment 6. The TOC in the filtrates were measured. The polyethyleneimine removal percentage calculated from the total organic carbon was 15%. Therefore, addition of calcium chloride, by itself, is insufficient to remove excess polyethyleneimine.

Embodiment 8

Three 100 ml aqueous solutions were prepared, each containing 100 ppm polyacrylic sodium (degree of polymerization 35,000). In a first sample, no addition was made. In a second sample, calcium chloride was added to a concentration of 400 ppm. Next, sodium polyphosphate was added to a concentration of 400 ppm. In the last sample, calcium chloride was added to a concentration of 800 ppm, and sodium polyphosphate was then added to a concentration of 800 ppm. The test samples containing added calcium chloride and sodium polyphosphate turned cloudy.

After the test samples stood for 1 hour, kaolin was added and filtration conducted in the same manner as in embodiment 6. The TOC values of the resulting filtrates were measured. The amount of polyacrylic sodium remaining in solution was calculated from the TOC values. In the second sample, having 400 ppm calcium chloride and 400 ppm sodium polyphosphate, the residual polyacrylic sodium was 1.7 ppm polyacrylic sodium. In the last sample, containing 800 ppm calcium chloride and 800 ppm sodium polyphosphate, the residual polyacrylic sodium was 1.7 ppm.

Comparison 4

Two 100 ml aqueous solutions were prepared, each containing 100 ppm polyacrylic sodium (degree of polymerization 35,000). To one, calcium chloride was added to a concentration of 400 ppm. To the other, sodium polyphosphate was added to a concentration of 400 ppm. The sample solution to which calcium chloride was added turned cloudy white immediately. The sample solution to which sodium polyphosphate was added did not become white and cloudy.

After letting these samples stand for one hour, kaolin was added and filtration conducted in a similar manner to embodiment 6. TOC values for the filtrates were measured. The amount of polyacrylic sodium remaining in solution was calculated from the TOC values. In the sample with 400 ppm calcium chloride, the amount of polyacrylic sodium remaining was 80 ppm. In the sample with 400 ppm sodium polyphosphate, the amount of polyacrylic sodium remaining was 90 ppm.

From the results of embodiment 8 and comparison 4, it can be seen that over 98% of polyacrylic sodium in solution is removed when calcium chloride and sodium polyphosphate are used in combination. In contrast, when only calcium chloride is used, only around 20% of the polyacrylic sodium is removed. Substantially no polyacrylic sodium is removed when only sodium polyphosphate is used.

Embodiment 9

Two 100 ml aqueous solutions were prepared, each containing 100 ppm polyethyleneimine (molecular weight 70,000) adjusted to pH 7.0 by addition of 0.1 N hydrochloric acid. To one, magnesium chloride was added to a concentration of 200 ppm. Next, sodium polyphosphate was added to a concentration of 200 ppm. To the other, magnesium chloride was added to a concentration of 400 ppm. Next, sodium polyphosphate was added to a concentration of 400 ppm. Both test sample solutions became white and cloudy.

After letting these samples stand for one hour, kaolin was added and filtration conducted in a similar manner to embodiment 6. TOC values for the filtrates were measured. The amount of polyethyleneimine remaining in solution was calculated from the TOC values. In the sample containing 200 ppm magnesium chloride and 200 ppm sodium polyphosphate, the amount of polyethyleneimine remaining was 2.1 ppm. In the sample containing 400 ppm magnesium chloride and 400 ppm sodium polyphosphate, the amount of polyethyleneimine remaining was 2.0 ppm.

Comparison 5

Two 100 ml aqueous solutions were prepared, each containing 100 ppm polyethyleneimine (molecular weight 70,000) as in embodiment 9. To one, sodium polyphosphate was added to a concentration of 200 ppm. To the other, magnesium chloride was added to a concentration of 200 ppm. The sample solution to which sodium polyphosphate was added turned cloudy and white immediately. The sample solution to which magnesium chloride was added did not become white and cloudy.

After letting these samples stand for one hour, kaolin was added and filtration conducted in a similar manner to embodiment 6. TOC values for the filtrates were measured. The amount of polyethyleneimine remaining in solution was calculated from the TOC values. In the sample with 200 ppm sodium polyphosphate, the amount of polyethyleneimine remaining was 25 ppm. In the sample with 200 ppm magnesium chloride, the amount of polyethyleneimine remaining was 92 ppm.

From the results of embodiment 9 and comparison 5, it can be seen that approximately 98% of polyethyleneimine in solution is removed if magnesium chloride and sodium polyphosphate are used in combination. In contrast, when only sodium polyphosphate is used, about 75% of the polyethyleneimine in solution is removed, and when only magnesium chloride is used, substantially no polyethyleneimine is removed.

Embodiment 10

1.0 g of chitosan (molecular weight 500,000, degree of deacetylation 0.90) was suspended in 100 ml of distilled water. After adding and dissolving 1.0 g of concentrated hydrochloric acid, the pH was adjusted to 6, using 1 N sodium hydroxide. The aqueous solution was adjusted to a chitosan concentration of 100 ppm by addition of distilled water. Three 100 ml samples of this aqueous solution were prepared. A control sample contained no addition. To a second sample, calcium chloride was added to a concentration of 200 ppm, and then sodium polyphosphate was added to make a concentration of 200 ppm. To the last sample, calcium chloride was added to a concentration of 400 ppm, and then sodium polyphosphate was added to a concentration of 400 ppm. The samples to which calcium chloride and sodium polyphosphate were added turned cloudy and white.

After letting these samples stand for one hour, kaolin was added and filtration conducted in a similar manner to embodiment 6. TOC values for the filtrates were measured. The amount of chitosan remaining in solution was calculated from the TOC values. In the sample containing 200 ppm calcium chloride and 200 ppm sodium polyphosphate, the amount of chitosan remaining was 1.9 ppm. In the sample containing 400 ppm calcium chloride and 400 ppm sodium polyphosphate, the amount of chitosan remaining was 1.7 ppm.

Comparison 6

Two 100 ml aqueous solutions were prepared, each containing 100 ppm chitosan as in embodiment 10. To one, sodium polyphosphate was added to a concentration of 200 ppm. To the other, calcium chloride was added to a concentration of 200 ppm. The sample solution to which sodium polyphosphate was added turned cloudy and white. The sample solution to which calcium chloride was added did not become white and cloudy.

After letting these samples stand for one hour, kaolin was added and filtration conducted in a similar manner to embodiment 6. TOC values for the filtrates were measured. The amount of chitosan remaining in solution was calculated from the TOC values. In the sample with 200 ppm sodium polyphosphate, the amount of chitosan remaining was 27 ppm. In the sample with 200 ppm calcium chloride, the amount of chitosan remaining was 87 ppm.

From the results of embodiment 10 and comparison 6, it can be seen that over 98% of chitosan in solution is removed if calcium chloride and sodium polyphosphate are used in combination. In contrast, when only sodium polyphosphate is used, only about 73% of the chitosan is removed, and when only calcium chloride is used, virtually no chitosan is removed.

Referring to Table 6, the results from embodiments 8–10 and comparisons 2–4 are summarized.

TABLE 6

| Embodiment | Water-soluble macro-molecular compound (ppm) | alkali earth metallic salt (ppm) | $Na^+$ poly-phosphate (ppm) | Residual water-soluble macro molecular compound (ppm) |
|---|---|---|---|---|
| Embodiment | polyacrylic sodium (100) | $CaCl_2$ (400) $CaCl_2$ (800) | 400 800 | 1.7 1.7 |
| Comparison | polyacrylic sodium (100) | $CaCl_2$ (400) — | — 400 | 80 90 |
| Embodiment | poly-ethyleneimine (100) | $MgCl_2$ (200) $MgCl_2$ (400) | 200 400 | 2.1 2.0 |
| Comparison | poly-ethyleneimine (100) | — $MgCl_2$ (200) | 200 — | 25 92 |
| Embodiment | Chitosan (100) | $CaCl_2$ (200) $CaCl_2$ (400) | 200 400 | 1.9 1.7 |
| Comparison | Chitosan (100) | — $CaCl_2$ (200) | 200 — | 27 87 |

With the method of the present invention, the simple addition of polyphosphate or polyphosphate plus an alkali earth metallic salt to an aqueous solution containing residual cationic, anionic, or amphoteric water-soluble macromolecular compounds results in the effective removal of the cationic, anionic, or amphoteric water-soluble macromolecular compounds without affecting the quality or yield of other valuable components in the aqueous solution. In particular, after cells within a fermentation solution have been aggregated and separated by a cationic macromolecular flocculant, the macromolecular flocculant remaining in solution can be selectively removed without lowering the activity or yield of fermentation products by adding a polyphosphate.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for removing residual cationic, anionic, or amphoteric water-soluble macromolecular compounds from an aqueous solution comprising the steps of:
    adding a polyphosphate to said aqueous solution, such that insoluble complexes of said polyphosphate and said water-soluble macromolecular compounds are formed;
    adding an alkali earth metallic salt to said aqueous solution; and
    separating said insoluble complexes from said aqueous solution.

2. A method for removing residual cationic, anionic, or amphoteric water-soluble macromolecular compounds from an aqueous solution according to claim 1, wherein said alkali earth metallic salt is at least one of beryllium fluoride, beryllium chloride, beryllium bromide, beryllium nitrate, beryllium sulfate, magnesium chloride, magnesium bromide, magnesium iodide, magnesium nitrate, magnesium sulfate, magnesium hydrogensulfate, magnesium thiosulfate, magnesium phosphate, magnesium chlorate, magnesium bromate, magnesium perchlorate, magnesium thiocyanate, magnesium formate, magnesium acetate, magnesium lactate, magnesium benzoate, magnesium salicylate, magnesium acetylsalicylate, calcium chloride, calcium bromide, calcium iodide, calcium nitrate, calcium nitrite, calcium thiosulfate, calcium hypophosphite, calcium chlorate, calcium thiocyanate, calcium formate, calcium acetate, calcium propionate, calcium 2-ethylbutanate, calcium lactate, calcium thioglycolate, calcium ascorbate, calcium levulinate, calcium acetylsalicylate, calcium phenolsulfonate, strontium chloride, strontium bromide, strontium iodide, strontium nitrate, strontium chlorate, strontium bromate, strontium formate, strontium acetate, strontium lactate, barium chloride, barium bromide, barium iodide, barium nitrate, barium nitrite, barium chlorate, barium perchlorate, and barium acetate.

3. A method for removing residual cationic, anionic, or amphoteric water-soluble macromolecular compounds from an aqueous solution according to claim 1, wherein said alkali earth metallic salt is calcium chloride.

4. A method for removing residual cationic, anionic, or amphoteric water-soluble macromolecular compounds from an aqueous solution according to claim 1, wherein said alkali earth metallic salt is added to said aqueous solution such that said alkali earth metallic salt is present at an amount that is between about 0.1 to 20 times a weight of said residual cationic, anionic, or amphoteric water-soluble macromolecular compounds in said aqueous solution.

5. A method for removing residual cationic, anionic, or amphoteric water-soluble macromolecular compounds from an aqueous solution according to claim 1, wherein said alkali earth metallic salt is added to said aqueous solution such that said alkali earth metallic salt is present at an amount that is between about 0.2 to 10 times a weight of said residual cationic, anionic, or amphoteric water-soluble macromolecular compounds in said aqueous solution.

6. A method for removing residual cationic, anionic, or amphoteric water-soluble macromolecular compounds from an aqueous solution according to claim 4, wherein said polyphosphate is present at a ratio of between about 0.2 to about 5 times the weight of said alkali earth metallic salts.

7. A method for removing residual cationic, anionic, or amphoteric water-soluble macromolecular compounds from an aqueous solution according to claim 4, wherein said polyphosphate is present at a ratio of between about 1 to about 3 times the weight of said alkali earth metallic salts.

8. A method for removing residual cationic, anionic, or amphoteric water-soluble macromolecular compounds from an aqueous solution according to claim 1, wherein said polyphosphate and said alkali earth metallic salt are added to said aqueous solution substantially simultaneously.

9. A method for removing residual cationic, anionic, or amphoteric water-soluble macromolecular compounds from an aqueous solution according to claim 1, wherein alkali earth metallic salt is added to said aqueous solution before said polyphosphate is added to said aqueous solution.

10. A method for removing residual cationic, anionic, or amphoteric water-soluble macromolecular compounds from an aqueous solution according to claim 1, wherein said step of separating includes at least one of sedimentation, filtration, centrifugation, or membrane separation.

11. A method for removing residual cationic, anionic, or amphoteric water-soluble macromolecular compounds from an aqueous solution according to claim 1, further comprising the step of adding water insoluble particles.

12. A method for removing residual cationic, anionic, or amphoteric water-soluble macromolecular compounds from an aqueous solution according to claim 11, wherein said water insoluble particles are at least one of kaolin, shirasu, diatomaceous earth, silica gel, activated carbon, pulp powder, crystaline cellulose powder, and styrene-divinyl benzene copolymer.

13. A method for purifying an aqueous fermentation production process solution containing fermentative cells, comprising the steps of:
    adding one of a water-soluble cationic flocculant and a water-soluble amphoteric flocculant to said solution, thereby forming aggregates of said fermentative cells;
    adding a polyphosphate to said aqueous solution, such that insoluble complexes of said polyphosphate and said water-soluble flocculant are formed;
    adding an alkali earth metallic salt to said aqueous solution; and separating said insoluble complexes from said aqueous solution.

14. A method for purifying a fermentation production process solution according to claim 13, further comprising the step of separating said aggregates from said solution.

15. A method for purifying a fermentation production process solution according to claim 13, further comprising the step of adding an anionic macromolecular flocculant after addition of said one of a water-soluble cationic flocculent and a water-soluble amphoteric flocculent.

16. A method for purifying a fermentation production process solution according to claim 14, wherein said step of separating said aggregates includes at least one of filtration, centrifugation, use of a belt press type water removal device, and membrane separation.

17. A method for purifying a fermentation production process solution according to claim 13, further comprising the step of adding water insoluble particles.

18. A method for purifying a fermentation production process solution according to claim 13, wherein said water-soluble cationic flocculant is at least one of polyethyleneimine, polyvinylamine, polyvinylamidine, poly(meta)allylamine, halogenated polydiallylammonium, polyaniinoalkylinethacrylate, and chitosan.

19. A method for purifying a fermentation production process solution according to claim 13, wherein said water-soluble amphoteric flocculant includes at least one of a carboxyl group and a sulfone group in a water-soluble cationic flocculent.

20. A method for purifying a fermentation production process solution according to claim 15, wherein said water-soluble anionic marcromolecular flocculant is at least one of, sodium polyacrylate, carboxtmethylcellulose, polyacrylamide partial hydrolysis product and acrylamide-acrylic copolymer.

* * * * *